United States Patent
Feng et al.

(10) Patent No.: US 9,875,441 B2
(45) Date of Patent: Jan. 23, 2018

(54) QUESTION RECOMMENDING METHOD, APPARATUS AND SYSTEM

(71) Applicant: Tencent Technology (Shenzhen) Company Limited, Shenzhen (CN)

(72) Inventors: Yang Feng, Shenzhen (CN); Jingsheng Li, Shenzhen (CN); Baqun Sun, Shenzhen (CN)

( * ) Notice: Subject to any disclaimer, the term of this patent is extended or adjusted under 35 U.S.C. 154(b) by 0 days.

(21) Appl. No.: 15/135,410

(22) Filed: Apr. 21, 2016

(65) Prior Publication Data

US 2016/0239738 A1 Aug. 18, 2016

Related U.S. Application Data

(63) Continuation of application No. PCT/CN2014/081808, filed on Jul. 8, 2014.

(30) Foreign Application Priority Data

Oct. 23, 2013 (CN) .......................... 2013 1 0503499

(51) Int. Cl.
G06N 99/00 (2010.01)
G06N 5/02 (2006.01)
G06F 17/30 (2006.01)

(52) U.S. Cl.
CPC .......... G06N 5/022 (2013.01); G06F 17/3053 (2013.01); G06F 17/30867 (2013.01); G06N 99/005 (2013.01)

(58) Field of Classification Search
CPC ....... G06N 99/00; G06N 99/005; G06N 5/022
See application file for complete search history.

(56) References Cited

U.S. PATENT DOCUMENTS

2012/0089621 A1* 4/2012 Liu .................. G06F 17/30699
707/749

FOREIGN PATENT DOCUMENTS

| CN | 101221583 A | 7/2008 |
|---|---|---|
| CN | 101354714 A | 1/2009 |
| CN | 101093509 A | 12/2012 |

OTHER PUBLICATIONS

S. Budalakoti et al., "Expertise Modeling and Recommendation in Online Question and Answer Forums", IEEE 2009 Int'l Conf. on Comp. Sci. and Eng., pp. 481-488.*

(Continued)

*Primary Examiner* — Vincent Gonzales
(74) *Attorney, Agent, or Firm* — Morgan, Lewis & Bockius LLP

(57) ABSTRACT

The present disclosure relates to a question recommending method, apparatus, and system. The method includes: constructing, by a server, an interest vector of a user according to a short-term interest, a long-term interest, and a group interest of the user, the interest vector of the user including multiple interest items; acquiring a candidate-for-recommendation question from a set of to-be-resolved questions according to the multiple interest items; estimating, according to a click-through rate (CTR) model, probability of answering the candidate-for-recommendation question by the user, and selecting a to-be-recommended question according to the estimated probability; and sending the to-be-recommended question to a client. In this way, a real-time comprehensive recommendation result can be obtained, and a question answering rate of an interactive question-and-answer platform can also be improved.

20 Claims, 11 Drawing Sheets

(56) References Cited

OTHER PUBLICATIONS

M. Zeb and M. Fasli, "Adaptive User Profiling for Deviating User Interests", Proc. IEEE 3rd Comp. Sci. and Elec. Eng. Conf., 2011, 65-70.*

Z. Pengyi et al., "Personalized Multimedia Information Retrieval based on User Profile Mining", J. Netw., vol. 8, No. 10, Oct. 2013, pp. 2340-2346.*

Tencent Technology, ISRWO, PCT/CN2014/081808, dated Aug. 29, 2014, 11 pgs.

Tencent Technology, IPRP, PCT/CN2014/081808, dated Apr. 26, 2016, 5 pgs.

* cited by examiner

QUESTION RECOMMENDING METHOD, APPARATUS AND SYSTEM

RELATED APPLICATIONS

This application is a continuation application of PCT Patent Application No. PCT/CN2014/081808, entitled "QUESTION RECOMMENDING METHOD, APPARATUS AND SYSTEM" filed on Jul. 8, 2014, which claims priority to Chinese Patent Application No. 201310503499.3, "QUESTION RECOMMENDING METHOD, APPARATUS AND SYSTEM," filed on Oct. 23, 2013, both of which are hereby incorporated by reference in their entirety.

FIELD OF THE TECHNOLOGY

The present disclosure relates to the technical field of computers and the Internet, and in particular, to a question recommending method, apparatus, and system.

BACKGROUND OF THE DISCLOSURE

Nowadays, more interactive question-and-answer communities provide question-and-answer interaction platforms for the vast majority of users. The question-and-answer interaction platform has the following features: some users ask questions in the community as questioners, and some other users who are capable of providing answers find and answer these questions as answerers, to resolve puzzles of the questioners; the questions and answers are accumulated on the platform, to form a repository, which can directly provide answers for subsequent "questioners" who have questions the same as those in the repository. In an interactive question-and-answer community, hundreds of thousands of questions are raised every day, and to provide answers to the questions rapidly and effectively, it is necessary to provide an approach to help answerers find in time questions that meet their interests and capabilities. An objective of a question recommending system is to recommend questions that meet interests and capabilities of capable users.

SUMMARY

The present disclosure provides a question recommending method, apparatus, and system, which can resolve problems in the prior art.

An embodiment of the present invention provides a question recommending method, including:

constructing, by a server, an interest vector of a user according to a short-term interest, a long-term interest, and a group interest of the user, the interest vector of the user including multiple interest items;

acquiring at least one candidate-for-recommendation question from a set of to-be-resolved questions according to the multiple interest items;

estimating, according to a click-through rate (CTR) model, a probability of answering the candidate-for-recommendation question by the user, and selecting a to-be-recommended question from the at least one candidate-for-recommendation question according to the estimated probability; and recommending the to-be-recommended question to a client of the user.

An embodiment of the present invention provides a question recommending apparatus, including:

an interest vector calculation module, configured to construct an interest vector of a user according to a short-term interest, a long-term interest, and a group interest of the user, the interest vector of the user including multiple interest items;

a candidate-for-recommendation question acquiring module, configured to acquire at least one candidate-for-recommendation question from a set of to-be-resolved questions according to the multiple interest items;

a to-be-recommended question acquiring module, configured to estimate, according to a CTR model, a probability of answering the candidate-for-recommendation question by the user, and select a to-be-recommended question from the at least one candidate-for-recommendation question according to the estimated probability; and a question recommending module, configured to recommend the to-be-recommended question to a client of the user.

An embodiment of the present invention provides a question recommending system, including a client and a server, where the client sends a question recommending request to the server, and the server returns a to-be-recommended question to the client according to the question recommending request; and the server includes: an interest vector calculation module, configured to: calculate a short-term interest, a long-term interest, and a group interest of the user and establish a CTR model, and construct an interest vector of the user according to the short-term interest, the long-term interest, and the group interest of the user, where the interest vector of the user includes multiple interest items; a candidate-for-recommendation question acquiring module, configured to acquire a candidate-for-recommendation question from a set of to-be-resolved questions according to the multiple interest items; a to-be-recommended question acquiring module, configured to estimate, according to the CTR model, a probability of answering the candidate-for-recommendation question by the user, and select a to-be-recommended question according to the estimated probability; and a question recommending module, configured to recommend the to-be-recommended question to the client.

In the question recommending method, apparatus, and system provided by the present disclosure, a short-term interest, a long-term interest, and a group interest of a user are combined to construct an interest vector of the user; a candidate-for-recommendation question is acquired from a set of to-be-resolved questions according to interest items in the interest vector of the user; then a probability of answering the candidate-for-recommendation question by the user is estimated according to a CTR model; a to-be-recommended question is selected according to the estimated probability, and the to-be-recommended question is recommended to a client, so that the recommended question is a question that meets interests of the user and that the user is willing to answer. In this way, a real-time comprehensive recommendation result can be acquired. Further, a question answering rate of an interactive question-and-answer platform can be improved.

The description above is merely a summary of the technical solutions of the present disclosure. To make the technical means of the present disclosure clearer so that it can be implemented according to the content of the specification, and to make the foregoing and other objectives, features, and advantages of the present disclosure easier to understand, the following provides a detailed description by using preferred embodiments with reference to the accompanying drawings.

DESCRIPTION OF EMBODIMENTS

To further illustrate technical means used in the present disclosure to achieve a predetermined invention objective and efficacy of the present disclosure, specific implementation manners, methods, steps, structures, features, and efficacy of a question recommending method and system provided according to the present disclosure are described in detail below with reference to the accompanying drawings and preferred embodiments.

Existing question recommending methods are classified into two types: one type is question recommending methods based on user interest matching, and the other type is question recommending methods based on CTR estimation.

Figure 1:
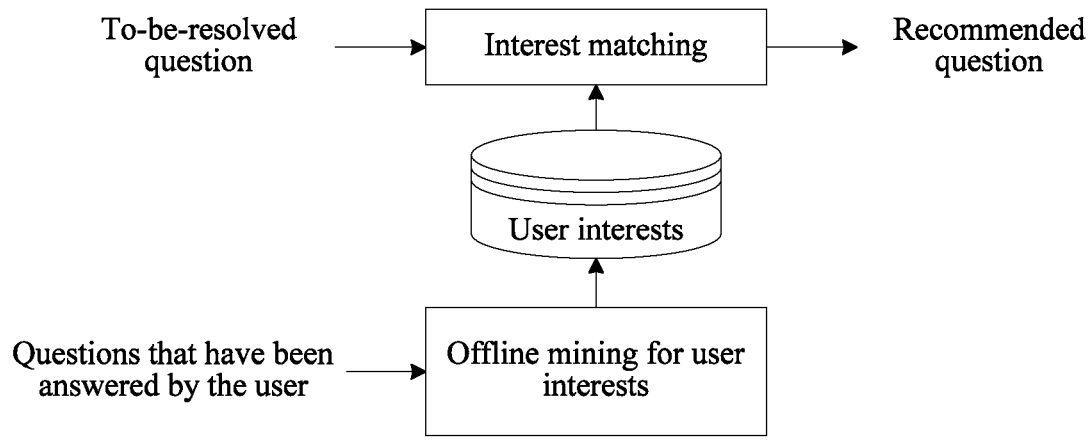
FIG. 1 is a schematic diagram of a principle of a question recommending method in an existing technology.

As shown in FIG. 1, in question recommendation based on user interest matching, interests of a user are dig out by using an offline mining technology and according to existing answers of the user. By means of interest matching, to-be-resolved questions that match the interests of the user are recommended for the user.

Figure 2:
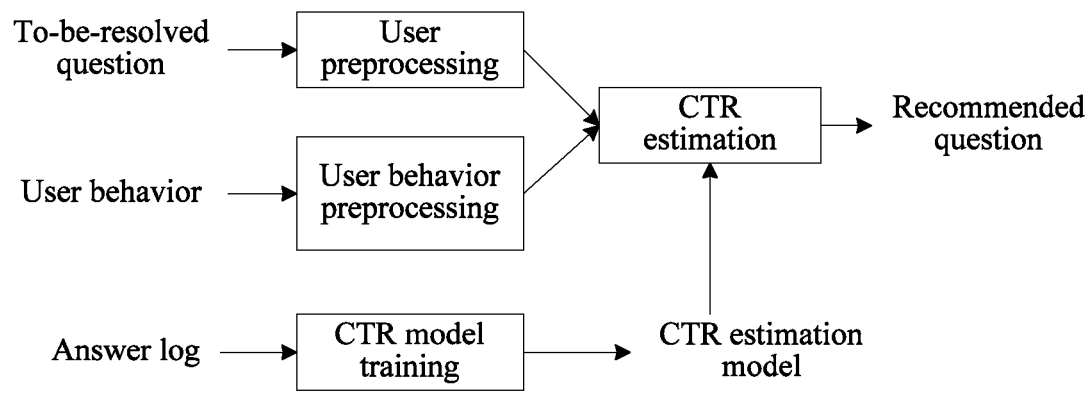
FIG. 2 is a schematic diagram of a principle of another question recommending method in an existing technology.

As shown in FIG. 2, in question recommendation based on CTR estimation, a CTR prediction model is obtained by means of training according to a historical exposure log (where the historical exposure log records which questions are displayed to which users) and a historical answer log (where the historical answer log records which questions are answered by which users). In a recommendation process, a probability of a to-be-resolved question being answered by a particular user after the to-be-resolved question is displayed to the particular user is predicted by using the model, all to-be-resolved questions are sorted according to probabilities of being answered, and the first N to-be-resolved questions are used as a recommendation result and displayed.

However, digging out interests of a user offline cannot catch up with a change in the interests of the user, and therefore, the recommendation result cannot embody an interest shift reflected by recent behaviors of the user. Interests that are dig out from historical answer records of the user by means of offline calculation are long-term interests of the user; such long-term interests are relatively stable, change slowly as time goes by, and reflect an accumulation of points of interests that are embodied by behaviors of the user in a relatively long period of time. However, interests of a user shift (change) as time goes by, and behaviors that are more recent play a more important role in embodying a change in user interests. However, in the conventional offline calculation manner, a user interest model is updated by means of regular calculation, which cannot capture a change in user interests in real time, and cannot dig out short-term interests generated due to recent behaviors of the user, thereby failing to rapidly embody the short-term interests in the recommendation result.

In a question recommending system based on CTR estimation, because there are a relatively large quantity of to-be-resolved answers and it is impossible to carry out calculation for all the questions, the user interest matching method is also used: first, the to-be-resolved questions are screened preliminarily, and only several questions matching interests of a user are extracted as candidates; and then, calculation of estimating answering rates is performed. Interests of a user are obtained by mining behavioral data of the user, and in both question recommendation based on user interest matching and question recommendation based on CTR estimation, matching calculation between questions and user interests needs to be performed based on the interests of the user.

However, for some inactive users that have very little behavioral data (or even no behavioral data), user interests these users cannot be obtained by means of mining, and questions related to the interests cannot be obtained by means of matching. In addition, for a large portion of users, even if their interests can be acquired, a phenomenon of sparse interests occurs. Points of interests of these users are excessively concentrated, or their points of interests receive very little attention, and very few questions are related to such a point of interest. Therefore, a phenomenon that the recommendation result is not comprehensive and lacks variety occurs.

In the question recommending method provided by the present disclosure, to resolve the foregoing problem, real-time answer records of a user are captured in real time, and a short-term interest of the user is calculated, which resolves the problem of a lag of a recommended interest in the question recommending method based on user interest matching; demographic statistical analysis is performed on interests written by the user or historical answer records, to construct a group interest model, which supplements user interests, and resolves the problem that in the question recommending method based on CTR estimation, a recommendation is not comprehensive and lacks variety. A complete interest vector of the user is constructed by combining a long-term interest, a short-term interest, and a group interest of the user. A candidate-for-recommendation question is retrieved from a set of to-be-resolved questions, and CRT estimation is performed with an answering rate of the user as an objective, and a question that meets the interests of the user and that the user is willing to answer is recommended for the user, thereby improving a question answering rate of an interactive question-and-answer platform. In addition, a question recommending system is established based on the question recommending method, to provide a question recommending service for the interactive question-and-answer community platform.

The foregoing and other technical content, features, and efficacy of the present disclosure can be shown clearly in the following detailed description of the preferred embodiments with reference to the accompanying drawings. According to the description of the specific implementation manners, the technical means used in the present disclosure to achieve the predetermined objective and the efficacy of the present disclosure can be comprehended more intensively and more specifically; however, the accompanying drawings are merely used for reference and illustration, but are not intended to limit the present disclosure.

First Embodiment

Figure 3:
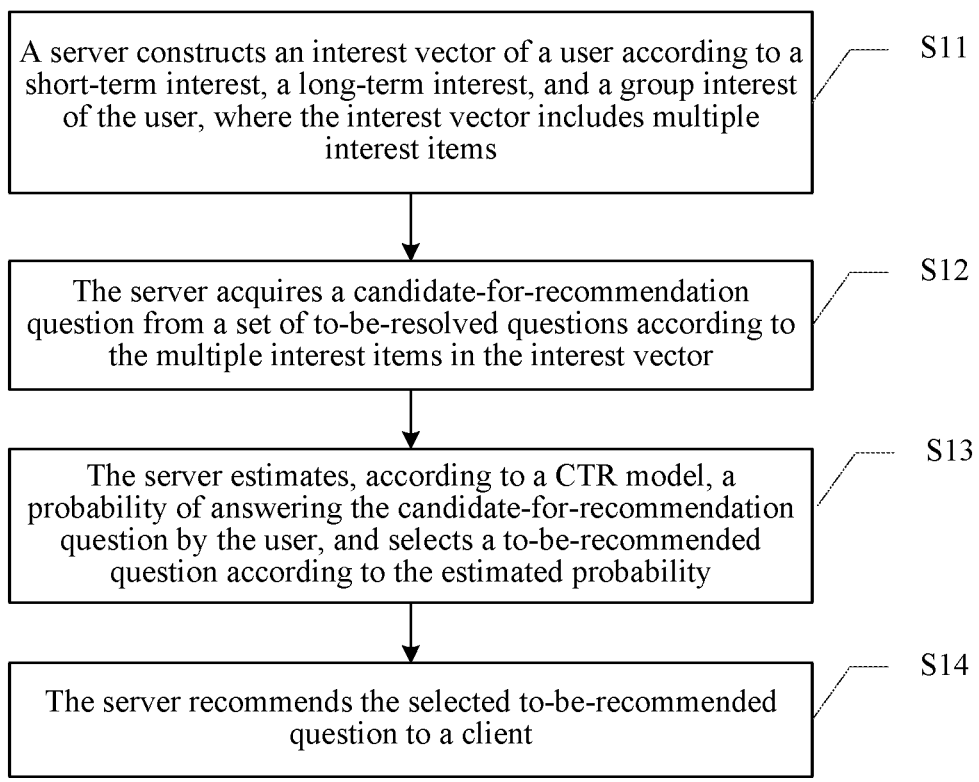
FIG. 3 is a schematic flowchart of a question recommending method in a first embodiment of the present invention.

FIG. 3 is a schematic flowchart of a question recommending method in a first embodiment of the present invention. Referring to FIG. 3, the question recommending method in this embodiment of the present invention includes:

Step S11: A server constructs an interest vector of a user according to a short-term interest, a long-term interest, and a group interest of the user, where the interest vector includes multiple interest items.

The short-term interest of the user may be obtained according to real-time answer records of the user, and by calculating the short-term interest of the user within predetermined duration, an interest change embodied by user behaviors is detected rapidly. The real-time answer records record questions answered by the user within the predetermined duration. The short-term interest reflects interest items embodied by behaviors of the user in a relatively short period of time, and has the following features: the interest items are relatively unstable, change rapidly as time goes by and as social hot spots change, are relatively concentrated, and the like.

The long-term interest of the user may be a user interest obtained by mining historical answer records, or may be obtained according to an interest written by the user in user profiles, which are stored in the server or in a database, of various applications (such as QQ or "Ask"). The long-term interest may reflect an accumulation of interest items embodied by behaviors of the user in a relatively long period of time, and has the following features: the interest items are relatively stable, change slowly as time goes by, are relatively scattered, and the like. The historical answer records record which users have answered which questions. For example, five questions: a, b, c, d, and e, are recommended for a user u1. Five questions: c, d, e, f, and g are also recommended for a user u2. In this case, the questions a and b are displayed (exposed) to the user u1 only. The questions e and f are displayed to the user u2 only. The questions c, d, and e are displayed to both the user u1 and the user u2. Assuming that the user u1 answers the questions a and c, and the user u2 answers the questions c and f, the foregoing answering behaviors are recorded in the historical answer records.

In terms of the group interest of the user, users may be classified into several groups according to attributes of the users. For different groups, long-term interests are dig out, and if interests of a user are sparse, a personalized interest of the user is estimated by using a group interest, and the interests of the user are supplemented according to the group to which the user belongs. Attributes of a user may include age, gender, occupation, education, and the like. The group interest may reflect a long-term interest of a group consisting of users having same attributes, and is an accumulation of interest items embodied by similar behaviors of a group of people in a relatively long period of time.

User interests from different sources (including the long-term interest of the user, the short-term interest of the user, and the group interest) are combined, to construct a complete interest vector of the user.

In a question recommending system, a CTR represents a probability of a problem being answered by the user after the problem is displayed. A CTR model may be obtained by means of CTR model training according to the historical answer records and historical exposure records. The historical exposure records record which questions are displayed to which users. For example, five questions: a, b, c, d, and e, are recommended for a user u1. Five questions: c, d, e, f, and g, are also recommended for a user u2. In this case, the questions a and b are exposed to the user u1 only. The questions e and f are exposed to the user u2 only. The questions c, d, and e are exposed to both the user u1 and the user u2. The historical exposure records record such exposure information, and scene information (such as an exposure time, a display position, paging, and sorting) during an exposure process.

Step S12: The server acquires a candidate-for-recommendation question from a set of to-be-resolved questions according to the multiple interest items in the interest vector.

In this step, questions related to the interest of the user are retrieved from a repository of to-be-resolved questions according to the interest items in the interest vector of the user, correlation between the retrieved questions and the interest of the user is calculated, and at least one question having highest correlation is extracted as the candidate-for-recommendation question.

Step S13: The server estimates, according to a CTR model, a probability of answering the candidate-for-recommendation question by the user, and selects a to-be-recommended question from the candidate-for-recommendation question according to the estimated probability.

Specifically, for a user feature, a question feature, and a scene feature, the probability of answering the candidate-for-recommendation question by the user may be predicted by using the CTR model, that is, CTR estimation is performed, and sorting is performed according to values of answering probabilities, where several questions having highest answering probabilities are extracted as to-be-recommended questions.

Step S14: The server recommends the selected to-be-recommended question to a client of the user.

Online calculation is performed for the short-term interest of the user, retrieval of the candidate question, and CTR estimation, and offline calculation is performed for the group interest model and CTR model training.

In the question recommending method provided by this embodiment, a short-term interest, a long-term interest, and a group interest of a user are combined to construct an interest vector of the user; a candidate-for-recommendation question is acquired from a set of to-be-resolved questions according to interest items in the interest vector of the user; then a probability of answering the candidate-for-recommendation question by the user is estimated according to a CTR model; a to-be-recommended question is selected from the candidate-for-recommendation question according to the estimated probability, and the to-be-recommended question is recommended to a client of the user, so that the recommended question is a question that meets interests of the user and that the user is willing to answer. In this way, a real-time comprehensive recommendation result can be acquired. Further, a question answering rate of an interactive question-and-answer platform can be improved.

Second Embodiment

Figure 4:
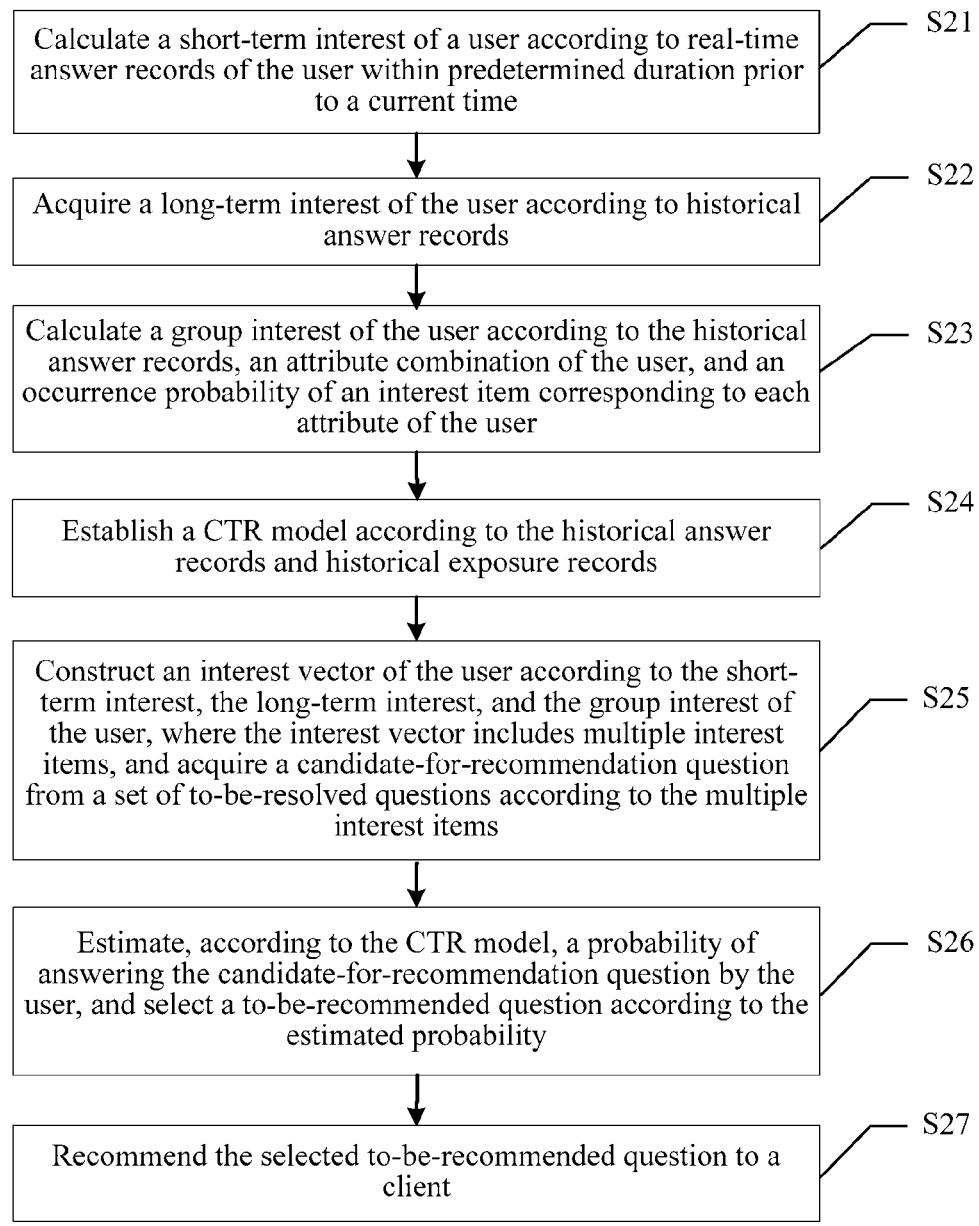
FIG. 4 is a schematic flowchart of a question recommending method in a second embodiment of the present invention.
Figure 5:
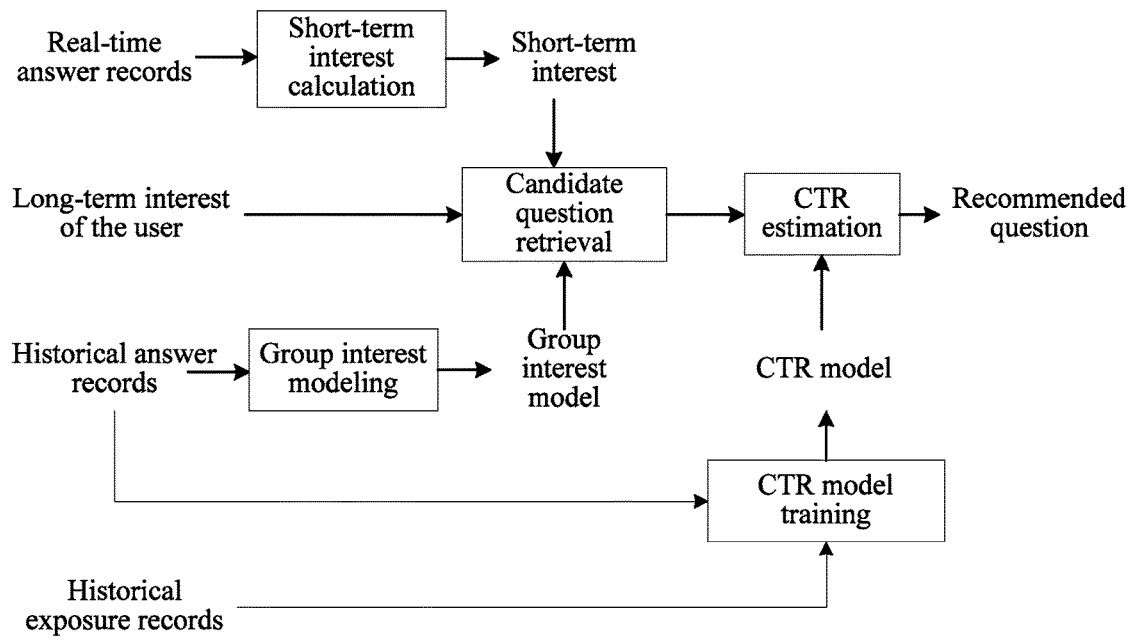
FIG. 5 is a block diagram of a principle of the question recommending method in the second embodiment of the present invention.

FIG. 4 is a schematic flowchart of a question recommending method in a second embodiment of the present invention. FIG. 5 is a block diagram of a principle of the question recommending method in this embodiment of the present invention. Referring to FIG. 4 and FIG. 5 together, the question recommending method in this embodiment of the present invention includes:

Step S21: Calculate a short-term interest of a user according to real-time answer records of the user within predetermined duration prior to a current time.

An interest of a user may be represented by an interest vector. The short-term interest of the user may be represented by a short-term interest vector. An interest item may include an interest keyword or an interest category. The short-term interest of the user is calculated according to a weight of each interest item in the short-term interest vector. For example, $C_u$ is used to represent a short-term interest of a user u, and $C_u$ may be expressed as follows:

$$C_u = \{(t_j, w_j^{(C)}) | j=1,2,\ldots N\} \quad (1)$$

$t_j$ is an interest item, and $w_j^{(C)}$ is a weight of the interest item $t_j$ in a short-term interest vector. To calculate a short-term interest of a user is to obtain a weight of each interest item in the short-term interest vector.

When the short-term interest of the user is calculated, factors of two aspects are mainly considered: frequency of an interest item and effectiveness of an interest item. Higher occurrence frequency of an interest item related to questions answered by the user in a short period of time indicates a greater weight of the interest item in the vector. As duration from a time point when the user answers a question to a current time point increases, an interest item related to the question has a lower weight (that is, the weight decays as time goes by). When the duration exceeds a preset threshold, the weight decreases to 0.

Figure 6:
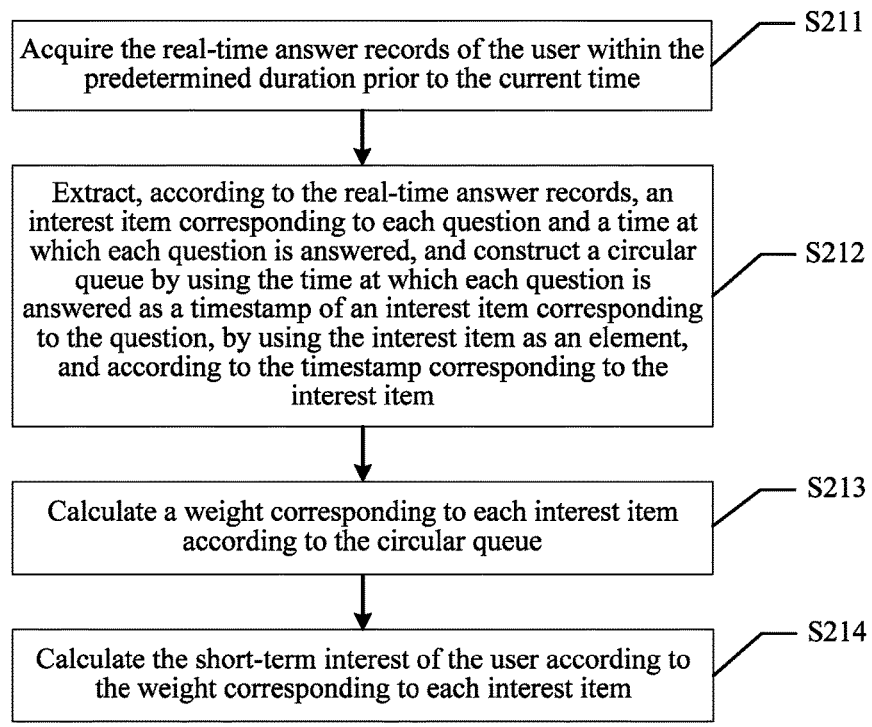
FIG. 6 is a detailed flowchart of step S21 in FIG. 4.

Considering the foregoing two factors, referring to FIG. 6, specifically, step S21 may include:

Step S211: Acquire the real-time answer records of the user within the predetermined duration prior to the current time.

The real-time answer records may be acquired from a question answering log recorded on a client of the user.

Step S212: Extract, according to the real-time answer records, an interest item corresponding to each question and a time at which each question is answered, and construct a circular queue by using the time at which each question is answered as a timestamp of an interest item corresponding to the question, by using the interest item as an element, and according to the timestamp corresponding to the interest item.

Figure 7:
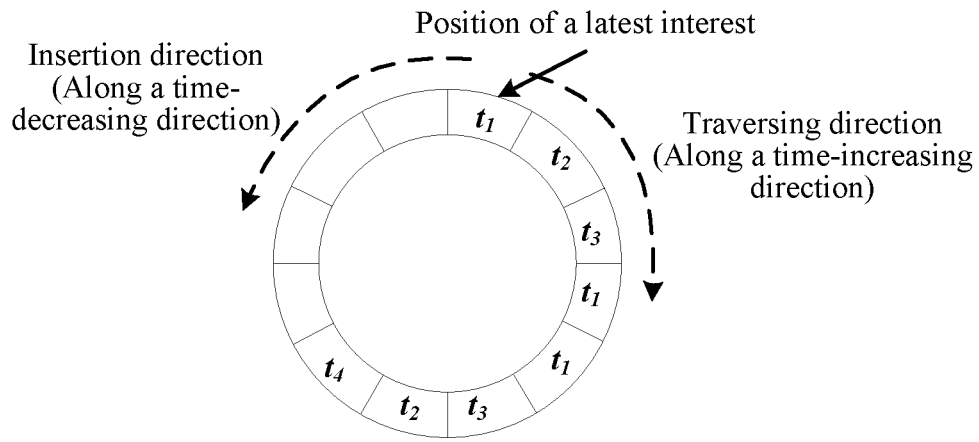
FIG. 7 is a schematic diagram of a circular queue of short-term interest items of a user.

In calculation of the short-term interest of the user, a circular queue with a fixed length of L may be established for each user that has a question answering behavior. Each element in the queue corresponds to an interest item and a timestamp of the interest item, and a position of a latest interest item is recorded, as shown in FIG. 7.

When a user has a new answering behavior, an interest item corresponding to the question and a timestamp of the behavior are extracted and inserted to a position in front of the latest interest item (where the insertion is performed along a time-decreasing direction), and the position of the latest interest item position is changed (moved towards the insertion direction).

Step S213: Calculate a weight corresponding to each interest item according to the circular queue.

When the short-term interest of the user is calculated, starting from the position of the latest interest item, traversing is performed along a direction opposite to the insertion direction, statistics about frequency of the interest items are collected, and weights are calculated according to timestamps.

Specifically, according to a position of each interest item in the circular queue, a time decay function when each interest item appears at the position and duration between the timestamp and the current time when each interest item appears at the position may be calculated. The weight corresponding to each interest item is calculated according to the time decay function when each interest item appears at the position and the duration between the timestamp and the current time when each interest item appears at the position.

$$w_j^{(C)} = \sum_{pos \& T_{j,pos} < \tau} \text{EXP}\left(\frac{\alpha}{1 + T_{j,pos}/\beta}\right) \quad (2)$$

$$\text{EXP}\left(\frac{\alpha}{1 + T_{j,pos}/\beta}\right)$$

is a time decay function when the interest item $t_j$ appears at a position pos. $T_{j,pos}$ is a duration between a position pos where the interest item $t_j$ is located and the current time point, where constants $\alpha$ and $\beta$ are used to adjust the amplitude and half-life period of time decay; $\tau$ is a validity period threshold of the interest item.

Step S214: Calculate the short-term interest of the user according to the weight corresponding to each interest item.

That is, $w_j^{(C)}$ obtained by means of calculation according to formula (2) is substituted into formula (1) to calculate the short-term interest $C_u$ of the user.

Step S22: Acquire a long-term interest of the user according to historical answer records.

Step S23: Calculate a group interest of the user according to the historical answer records, an attribute combination of the user, and an occurrence probability of an interest item corresponding to each attribute of the user.

Figure 8:
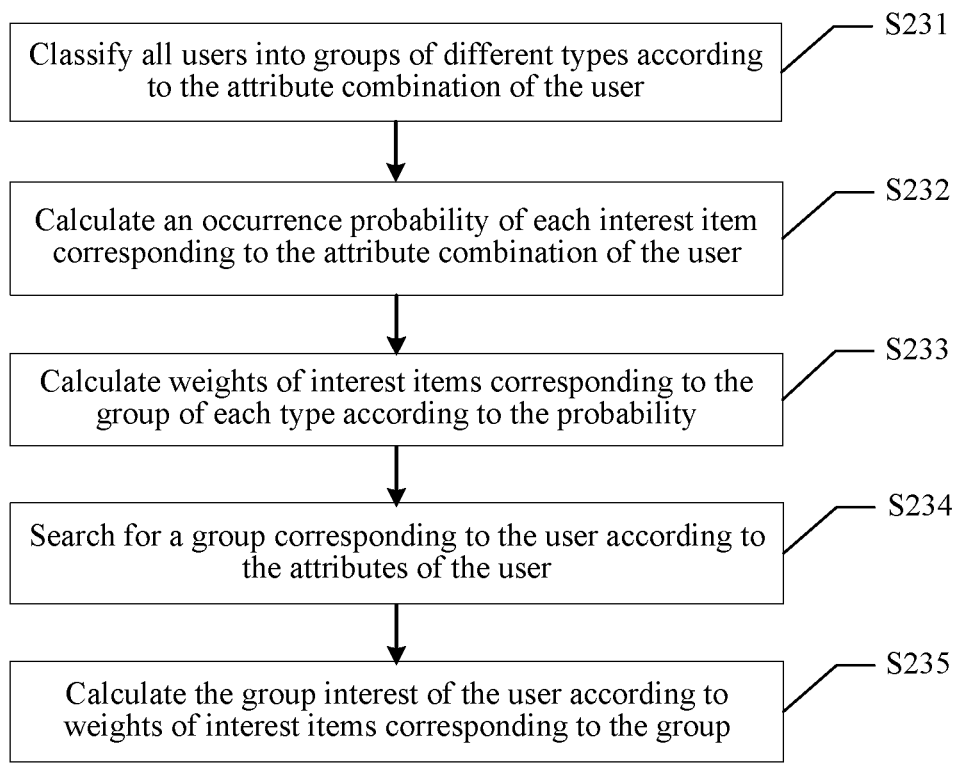
FIG. 8 is a detailed flowchart of step S23 in FIG. 4.

Referring to FIG. 8, step S23 may include:

Step S231: Classify all users into groups of different types according to the attribute combination of the user.

Step S232: Calculate an occurrence probability of each interest item corresponding to the attribute combination of the user.

Step S233: Calculate weights of interest items corresponding to the group of each type according to the probability.

Step S234: Search for a group corresponding to the user according to the attributes of the user.

Step S235: Calculate the group interest of the user according to weights of interest items corresponding to the group.

Specifically, each user has certain attributes. When these attributes are set to different values and combined together, groups of different types are formed (for example: "age: 25 to 27, male, bachelor degree, IT practitioner"). In group interest modeling, a group interest model is constructed by collecting statistics about interest items of different groups, to estimate most possible interest items of a user when the user belongs to a particular group, and weights of these interest items.

If D represents the group interest, and $r_i$ represents a value of the $i^{th}$ attribute of the user, the model may be expressed as follows:

$$D=\{P(t_j|r_1,r_2,\ldots,r_M)|j=1,2,\ldots N\} \quad (3)$$

$P(t_j|r_1, r_2, \ldots, r_M)$ represents an occurrence probability of the interest item $t_j$ when an attribute combination $r_1, r_2, \ldots, r_M$ of the user appears. Group interest modeling is to establish such a probability model for all interest items; then, an inverted list from groups to interest items is established, and sorting is carried out in the inverted list according to probability values, to filter out interest items whose probability values are relatively low.

It consumes large space to directly collect statistics about $P(t_j|r_1, r_2, \ldots, r_M)$ (for example, when there are millions of interest items and thousands of groups, billions of storage units need to be used to record frequency of the interest items). Therefore, assuming that values of user attributes are independent of each other, $P(t_j|r_1, r_2, \ldots, r_M)$ may be calculated by using the Bayesian theorem:

$$P(t_j|r_1,r_2,\ldots,r_M) = \frac{P(r_1,r_2,\ldots,r_M|t_j) \times P(t_j)}{P(r_1,r_2,\ldots,r_M)} \quad (4)$$

In formula (4), $P(r_1, r_2, \ldots, r_M|t_j)$ and $P(r_1, r_2, \ldots, r_M)$ are two joint probabilities, and because attributes are independent of each other, the following formulas are true:

$$P(r_1,r_2,\ldots,r_M|t_j) = \sum_{i=1}^{M} P(r_i|t_j) \quad (5)$$

$$P(r_1,r_2,\ldots,r_M) = \sum_{i=1}^{M} P(r_i) \quad (6)$$

$P(t_j)$ $P(t_j)$ in formulas (4), (5), and (6) represents a probability of the interest item $t_j$, $P(r_i|t_j)$ is a conditional probability that the value of the $i^{th}$ attribute is $r_i$ on the condition that the interest item $t_j$ appears, $P(r_i)$ is a probability of the $i^{th}$ attribute being $r_i$, $P(t_j)$, $P(r_i|t_j)$, and $P(r_i|t_j)$ can all be directly obtained by means of statistics collection in the historical answer records. Then, $P(t_j|r_1, r_2, \ldots, r_M)$ corresponding to each combination of attribute values is calculated by using formula (4), an inverted list is established, and sorting and filtering are performed.

After the group interest mode is established, for the user u, a group to which the user u belongs can be obtained according to the attribute combination. A group interest vector of the user u is constructed according to an interest item set of the group:

$$(7) \quad D=\{(t_j,w_i^{(D)})|j=1,2,\ldots N\}$$

$D_u$ represents the group interest vector of the user u, and $w_i^{(D)}$ represents a weight of the interest item $t_j$ in the vector:

$$w_i^{(D)}=P(t_j|r_1,r_2,\ldots,r_M) \quad (8)$$

Step S24: Establish a CTR model according to the historical answer records and historical exposure records.

Figure 9:
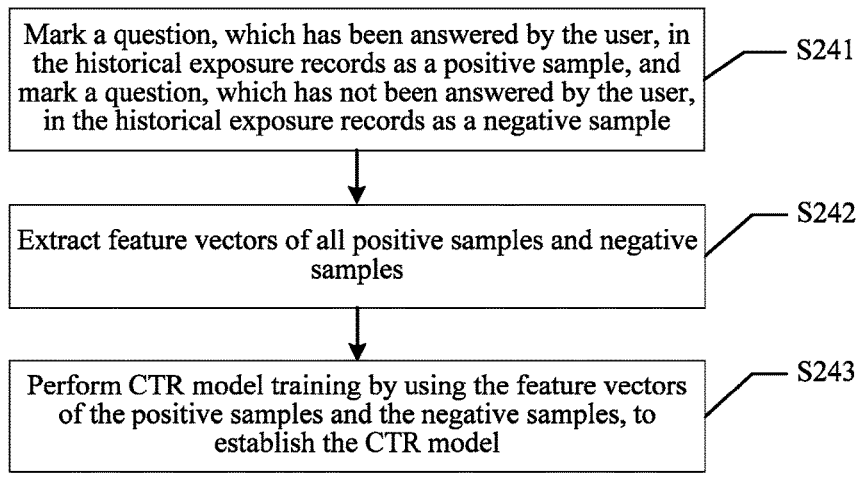
FIG. 9 is a detailed flowchart of step S24 in FIG. 4.

Referring to FIG. 9, step S24 may include:

Step S241: Mark a question, which has been answered by the user, in the historical exposure records as a positive sample, and mark a question, which has not been answered by the user, in the historical exposure records as a negative sample.

Step S242: Extract feature vectors of all positive samples and negative samples.

Step S243: Perform CTR model training by using the feature vectors of the positive samples and the negative samples, to establish the CTR model.

The feature vector includes: a user feature vector, a question feature vector, and a scene feature vector.

A user feature is a feature that is inherent to a user, and changes little as a scene changes, for example, a category of the long-term interest of the user, a keyword of the long-term interest of the user, an experience value of the user, credits of the user, and answering frequency of the user.

A question feature is a feature that is inherent to a question, and changes little as a scene changes, for example, a category of the question, a keyword of the question, a reward value of the question, a regional characteristic of the question, and a title length of the question.

A scene feature is a feature that changes significantly as time and space change, for example, a degree of matching between a question and a user interest, a type of a user interest hit by the question, and time when the question is recommended.

CTR model training may be performed by using the following methods: logistic regression (LR), maximum entropy, decision tree, and the like. For example, CTR model training is performed by using an LR method, and during a model training process, parameters of an LR model are estimated by means of stochastic gradient descent (SGD). The CTR model trained by using training samples is actually an LR model. With this model, a CTR of a sample having an unknown CTR probability may be estimated.

Specifically, it is assumed that a target function in LR is:

$$p(y=\pm 1) = \frac{1}{1+\exp(-yW^T X)} \quad (9)$$

$X=(x_1, x_2 \ldots x_n)^T$ $X=(x_1, x_2 \ldots x_n)^T$ is a feature vector, $W=(w_1, w_2 \ldots w_n)^T$ $W=(w_1, w_2 \ldots w_n)^T$ is a feature weight vector, $y=+1$ and $y=-1$ represent being clicked and not being clicked respectively, and $p(y=\pm 1)$ is a probability of being clicked or not being clicked.

In a training process, a y value of each sample (whether the sample is clicked or not) and a feature vector X of the sample are known, and a value of W making the target function maximum (that is, maximizing the probability) needs to be acquired, which is an optimization problem, that is, a value of W making formula (10) true needs to be acquired:

$$\max_w \left\{ \sum_{i=1}^{N} \log(p(y_i)) \right\} = -\sum_{i=1}^{N} \{1+\exp(-y_i W^T X_i)\} \quad (10)$$

$y_i$ in the foregoing formula represents whether the $i^{th}$ sample is clicked or not (+1 or −1), and $X_i$ is a feature vector of the $i^{th}$ sample.

In an implementation manner, SGD is one of the methods for resolving the foregoing optimization problem in the training process. The parameter estimated according to the training samples is the weight coefficient vector W of the feature vector. Finally, the CTR model is described by using the weight coefficient vector.

It should be noted that, step S21 to step S24 above may be performed simultaneously or may be performed in sequence, and the specific implementation manners of the present invention are not limited thereto.

Step S25: Construct an interest vector of the user according to the short-term interest, the long-term interest, and the group interest of the user, where the interest vector includes multiple interest items, and acquire a candidate-for-recommendation question from a set of to-be-resolved questions according to the multiple interest items.

Figure 10:
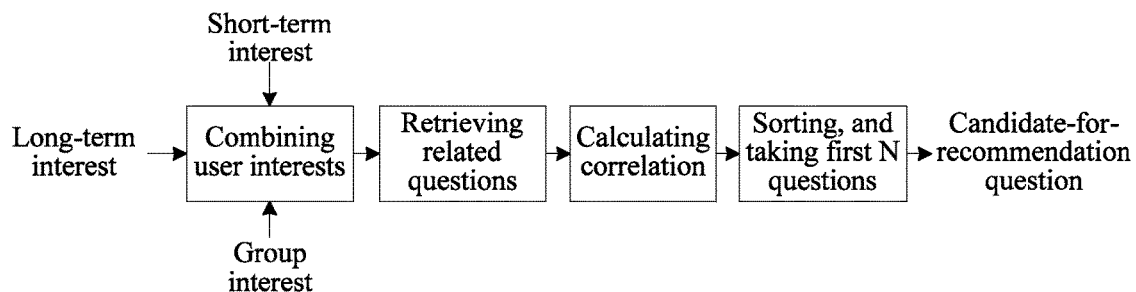
FIG. 10 is a block diagram of a principle for selecting a candidate-for-recommendation question.

Referring to FIG. 10 at the same time, the short-term interest, the long-term interest, and the group interest of the user may be combined by means of linear weighting of vectors, to obtain the interest vector $S_u$ of the user.

$$S_u = a \times A_u + c \times C_u + d \times D_u \quad (11)$$

$A_u$ is a vector of the long-term interest of the user, and a weighting coefficient a of the vector $A_u$, of the long-term interest of the user is in a range of $0.1 \leq a \leq 0.5$; a weighting coefficient c of a vector $C_u$ of the short-term interest of the user is in a range of $0.5 \leq c \leq 0.8$; and a weighting coefficient d of a vector $D_u$ of the group interest vector of the user is in a range of $0.1 \leq d \leq 0.5$. In one implementation manner, a, c, and d satisfy the following relationship: c>a>d. In other words, the vector weighting coefficient of the short-term interest of the user>the weighting coefficient vector of the long-term interest of the user>the vector weighting coefficient of the group interest of the user. In one implementation manner, a may be 0.2, c may be 0.7, and d may be 0.1.

Figure 11:
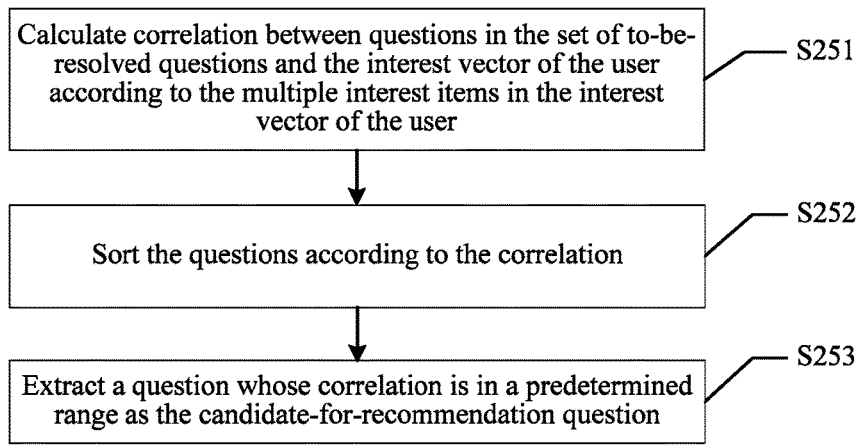
FIG. 11 is a detailed flowchart of step S25 in FIG. 4.

Referring to FIG. 11, step S25 may further include:

Step S251: Calculate correlation between questions in the set of to-be-resolved questions and the interest vector of the user according to the multiple interest items in the interest vector of the user.

Step S252: Sort the questions according to the correlation.

Step S253: Extract a question whose correlation is in a predetermined range as the candidate-for-recommendation question.

In one implementation manner, correlation calculation may be performed by using methods such as Pearson correlation, Euclidean distance, BM2.5 for correlation calculation. For example, correlation between questions in the set of to-be-resolved questions and the interest vector of the user is calculated by using a cosine correlation calculation method. Assuming that $Q_k$ is a keyword vector of a question k, a cosine value of an angle between the vector $Q_k$ and the interest vector $S_u$ of the user is correlation between the question k and the interest vector $S_u$ of the user:

$$S_u sim(S_u, Q_k) = \cos(S_u, Q_k) = \frac{S_u \cdot Q_k}{|S_u| \times |Q_k|} \quad (12)$$

Step S26: Estimate, according to the CTR model, a probability of answering the candidate-for-recommendation question by the user, and select a to-be-recommended question according to the estimated probability.

A related question is not necessary a question that the user is good at or the user is willing to answer. There is no necessary causal relationship between correlation with the interest and answering by the user (or shift of recommendation). The CTR estimation method is a method that uses a user answering rate as an objective, and a probability of answering a new question by a user is predicted according to correlation, reflected by historical question records, between features (including a user feature, a question feature, and a scene feature) and answers.

Figure 12:
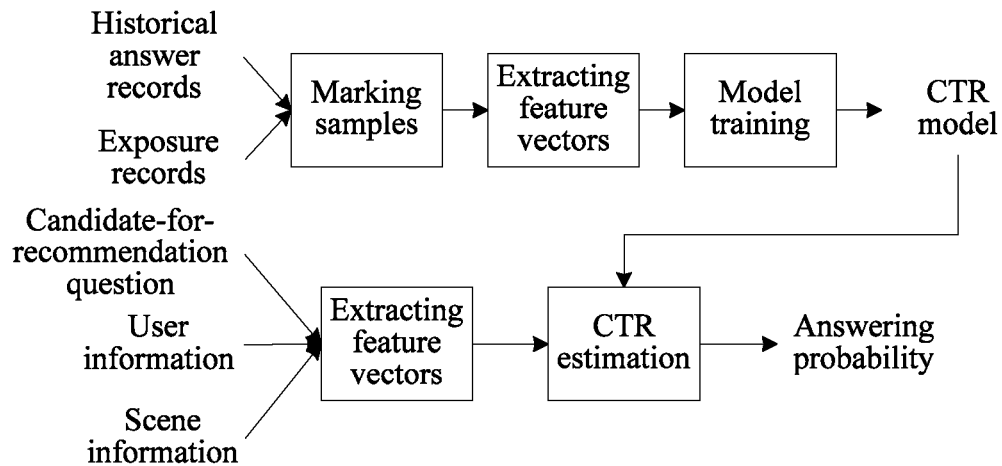
FIG. 12 is a block diagram of principles of CTR model training and CTR estimation.

Specifically, referring to FIG. 12, for the user feature, question feature, and scene feature, a probability of answering the candidate-for-recommendation question by the user may be predicted by using the CTR model. That is, CTR estimation is performed, sorting is performed according to values of answering probabilities, and several questions having highest answering probabilities are extracted as to-be-recommended questions. Specifically, a feature vector of the user, a feature vector of the candidate-for-recommendation question, and a feature vector of a current scene may be extracted first; then, the probability of answering the candidate-for-recommendation question by the user is estimated by using the feature vectors and the CTR model. The step of selecting a to-be-recommended question according to the estimated probability includes: sorting the candidate-for-recommendation question according to the estimated probability, and extracting a question whose probability is in a predetermined range as the to-be-recommended question.

Step S27: Recommend the selected to-be-recommended question to a client of the user.

In the question recommending method provided by this embodiment, a short-term interest, a long-term interest, and a group interest of a user are combined to construct an interest vector of the user; a candidate-for-recommendation question is acquired from a set of to-be-resolved questions according to interest items in the interest vector of the user; then a probability of answering the candidate-for-recommendation question by the user is estimated according to a CTR model; a to-be-recommended question is selected according to the estimated probability, and the to-be-recommended question is recommended to a client, so that the recommended question is a question that meets interests of the user and that the user is willing to answer. In this way, a real-time comprehensive recommendation result can be acquired in time. Further, a question answering rate of an interactive question-and-answer platform can be improved.

Third Embodiment

Figure 13:
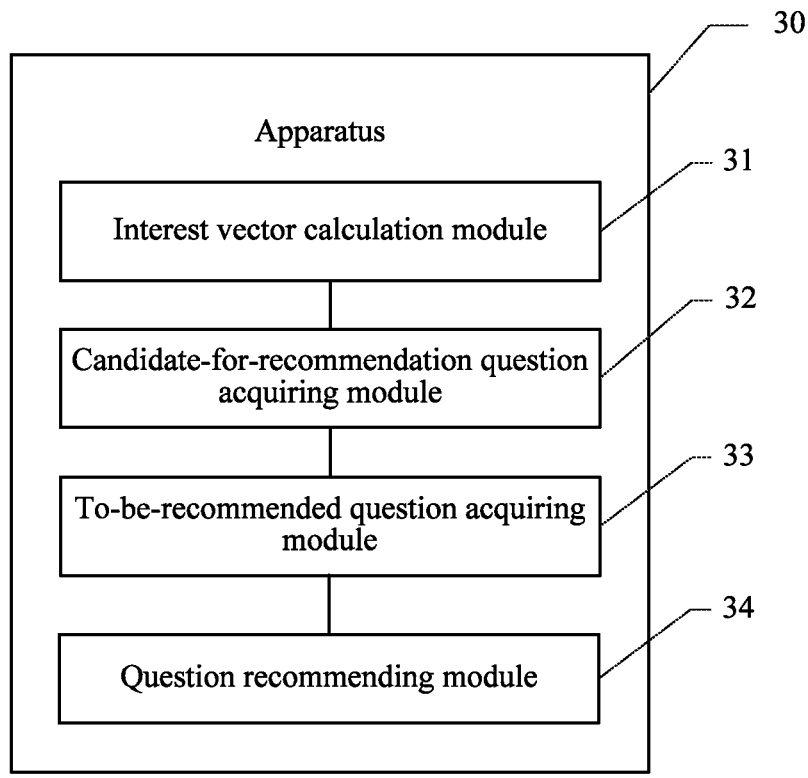
FIG. 13 is a schematic structural diagram of a question recommending apparatus in a third embodiment of the present invention.

Refer to FIG. 13, which is a schematic structural diagram of a question recommending apparatus in a third embodiment of the present invention. The apparatus may run in the server in the foregoing embodiment, and the apparatus 30 includes: an interest vector calculation module 31, a candidate-for-recommendation question acquiring module 32, a to-be-recommended question acquiring module 33, and a question recommending module 34.

The interest vector calculation module 31 is configured to construct an interest vector of a user according to a short-term interest, a long-term interest, and a group interest of the user, where the interest vector of the user includes multiple interest items.

The candidate-for-recommendation question acquiring module 32 is configured to acquire at least one candidate-for-recommendation question from a set of to-be-resolved questions according to the multiple interest items.

The to-be-recommended question acquiring module 33 is configured to estimate, according to a CTR model, a probability of answering the candidate-for-recommendation question by the user, and select a to-be-recommended question from the at least one candidate-for-recommendation question according to the estimated probability.

The question recommending module 34 is configured to recommend the to-be-recommended question to a client of the user.

The foregoing modules may be implemented by software code, and in this case, the foregoing modules may be stored in a memory. The foregoing modules may also be implemented by hardware, such as an integrated circuit chip.

It should be noted that, functions of the functional modules in this embodiment of the present invention may be specifically implemented according to the method in the foregoing method embodiment; for a specific implementation process, reference may be made to the related description of the foregoing method embodiment, and details are not described herein again.

In this embodiment of the present invention, a short-term interest, a long-term interest, and a group interest of a user are combined to construct an interest vector of the user; a candidate-for-recommendation question is acquired from a set of to-be-resolved questions according to interest items in the interest vector of the user; then a probability of answering the candidate-for-recommendation question by the user is estimated according to a CTR model; a to-be-recommended question is selected according to the estimated probability, and the to-be-recommended question is recommended to a client, so that the recommended question is a question that meets interests of the user and that the user is willing to answer. In this way, a real-time comprehensive recommendation result can be acquired in time. Further, a question answering rate of an interactive question-and-answer platform can be improved.

Fourth Embodiment

Figure 14:
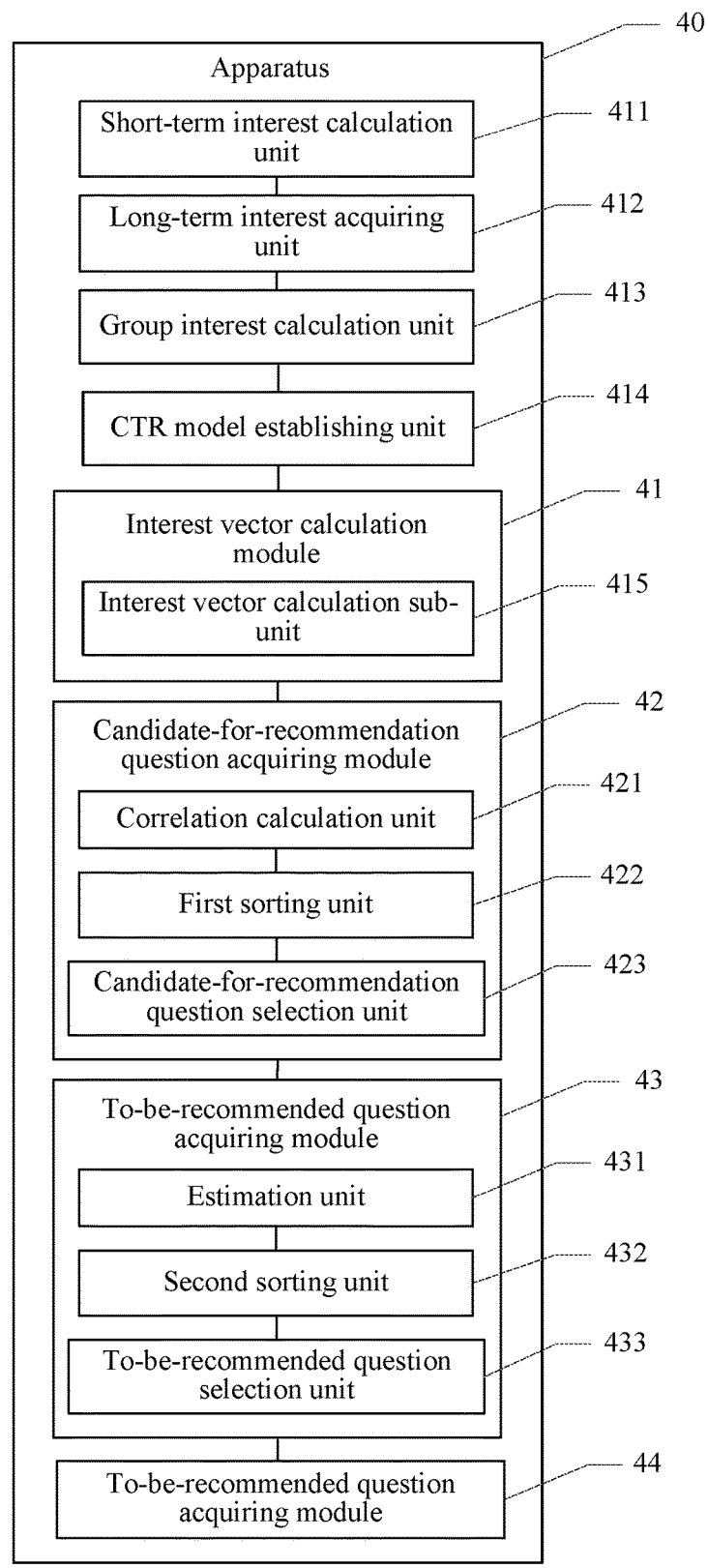
FIG. 14 is a schematic structural diagram of a question recommending apparatus in a fourth embodiment of the present invention.

Refer to FIG. 14, which is a schematic structural diagram of a question recommending apparatus in a fourth embodiment of the present invention. The apparatus may run in the server in the foregoing embodiment. The apparatus 40 includes: an interest vector calculation module 41, a candidate-for-recommendation question acquiring module 42, a to-be-recommended question acquiring module 43, and a question recommending module 44.

The interest vector calculation module 41 is configured to construct an interest vector of a user according to a short-term interest, a long-term interest, and a group interest of the user, where the interest vector of the user includes multiple interest items.

The candidate-for-recommendation question acquiring module 42 is configured to acquire at least one candidate-for-recommendation question from a set of to-be-resolved questions according to the multiple interest items.

The to-be-recommended question acquiring module 43 is configured to estimate, according to a CTR model, a probability of answering the candidate-for-recommendation question by the user, and select a to-be-recommended question from the at least one candidate-for-recommendation question according to the estimated probability.

The question recommending module 44 is configured to recommend the to-be-recommended question to a client of the user.

In one implementation manner, the apparatus further includes: a short-term interest calculation unit 411, configured to calculate the short-term interest of the user according to real-time answer records of the user within predetermined duration prior to a current time.

In one implementation manner, the apparatus further includes: a long-term interest acquiring unit 412, configured to acquire the long-term interest of the user according to historical answer records.

In one implementation manner, the apparatus further includes: a group interest calculation unit 413, configured to calculate the group interest of the user according to historical answer records, attributes of the user, and an occurrence probability of an interest item corresponding to each attribute of the user.

In one implementation manner, the apparatus further includes: a CTR model establishing unit 414, configured to establish the CTR model according to historical answer records and historical exposure records.

In this embodiment, the interest vector calculation module 41 may include:

an interest vector calculation sub-unit 415, configured to combine the short-term interest, the long-term interest, and the group interest of the user according to a vector weighting coefficient of the short-term interest of the user, a vector weighting coefficient of the long-term interest of the user, and a vector weighting coefficient of the group interest of the user and by means of linear weighting of vectors, to obtain the interest vector of the user.

The vector weighting coefficient of the short-term interest of the user is greater than the vector weighting coefficient of the long-term interest of the user, and the vector weighting coefficient of the long-term interest of the user is greater than the vector weighting coefficient of the group interest of the user, where the vector weighting coefficient of the short-term interest of the user is greater than or equal to 0.5 and less than or equal to 0.8, the vector weighting coefficient of the long-term interest of the user is greater than or equal to 0.1 and less than or equal to 0.5, and the vector weighting coefficient of the group interest of the user is greater than or equal to 0.1 and less than or equal to 0.5. Preferably, the vector weighting coefficient of the long-term interest of the user is 0.2, the vector weighting coefficient of the short-term interest of the user is 0.7, and the vector weighting coefficient of the group interest of the user is 0.1.

In this embodiment, the candidate-for-recommendation question acquiring module 42 includes:

a correlation calculation unit 421, configured to calculate correlation between questions in the set of to-be-resolved questions and the interest vector of the user according to the multiple interest items;

a first sorting unit 422, configured to sort the questions according to the correlation; and a candidate-for-recommendation question selection unit 423, configured to extract a question whose correlation is in a predetermined range as the candidate-for-recommendation question.

In this embodiment, the to-be-recommended question acquiring module 43 includes:

an estimation unit 431, configured to estimate, according to the CTR model, the probability of answering the candidate-for-recommendation question by the user;

a second sorting unit 432, configured to sort the candidate-for-recommendation question according to the estimated probability; and a to-be-recommended question selection unit 433, configured to extract a question whose probability is in a predetermined range as the to-be-recommended question.

Figure 15:
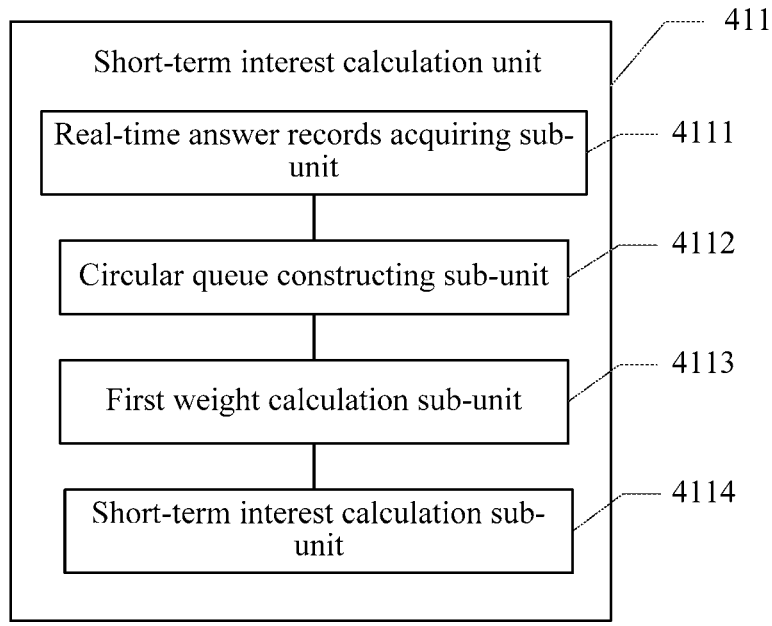
FIG. 15 is a detailed schematic structural diagram of a short-term interest calculation unit in FIG. 14.

Referring to FIG. 15, further, the short-term interest calculation unit 411 may include:

a real-time answer records acquiring sub-unit 4111, configured to acquire real-time answer records of the user within predetermined duration prior to the current time;

a circular queue constructing sub-unit 4112, configured to extract, according to the real-time answer records, an interest item corresponding to each question and a time at which each question is answered, and construct a circular queue by using the time at which each question is answered as a timestamp of the interest item corresponding to the question, by using the interest item as an element, and according to the timestamp corresponding to the interest item;

a first weight calculation sub-unit 4113, configured to calculate a weight corresponding to each interest item according to the circular queue; and a short-term interest calculation sub-unit 4114, configured to calculate the short-term interest of the user according to the weight corresponding to each interest item.

The first weight calculation sub-unit 4113 is configured to calculate, according to a position of each interest item in the circular queue, a time decay function when each interest item appears at the position and a duration between a timestamp when each interest item appears at the position and the current time; and calculate the weight corresponding to each interest item according to the time decay function when each interest item appears at the position and the duration between the timestamp when each interest item appears at the position and the current time.

Figure 16:
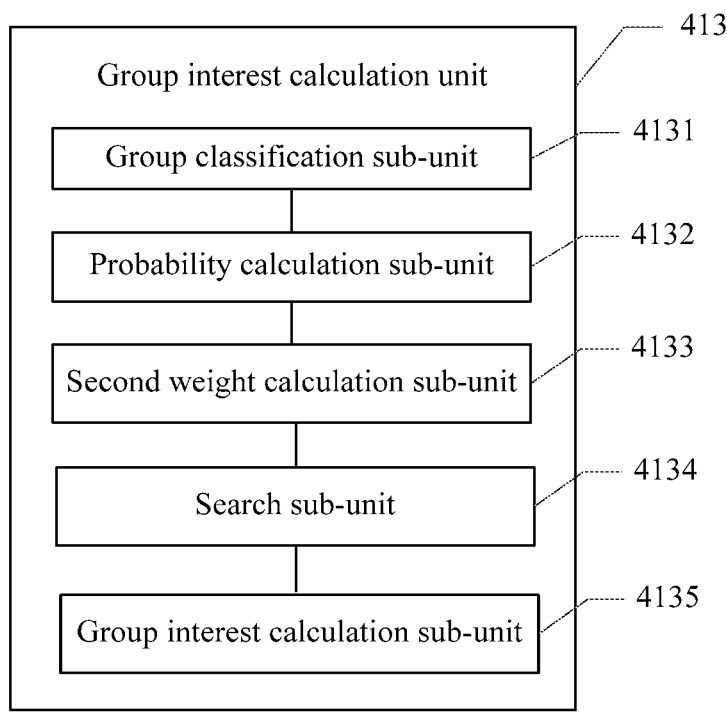
FIG. 16 is a detailed schematic structural diagram of a group interest calculation unit in FIG. 14.

Referring to FIG. 16, further, the group interest calculation unit 413 may include:

a group classification sub-unit 4131, configured to classify all users into groups of different types according to an attribute combination of the user;

a probability calculation sub-unit 4132, configured to calculate an occurrence probability of each interest item corresponding to the attribute combination of the user;

a second weight calculation sub-unit 4133, configured to calculate weights of interest items corresponding to the group of each type according to the probability;

a search sub-unit 4134, configured to search for a group corresponding to the user according to the attributes of the user; and a group interest calculation sub-unit 4135, configured to calculate the group interest of the user according to weights of interest items corresponding to the group.

Figure 17:
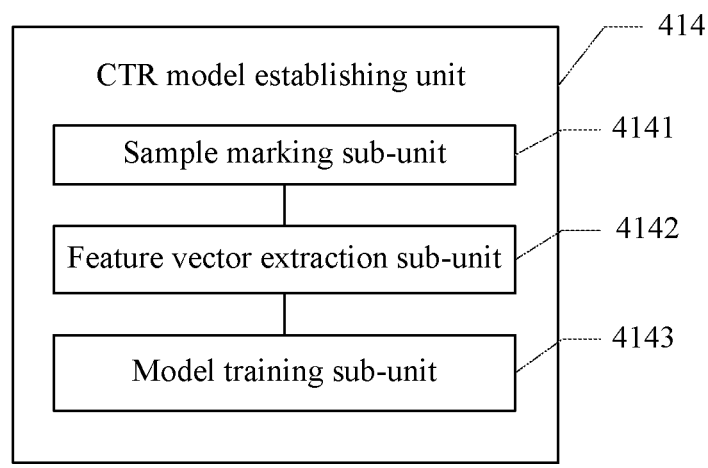
FIG. 17 is a specific schematic structural diagram of a CTR model establishing unit in FIG. 14.

Referring to FIG. 17, further, the CTR model establishing unit 414 may include:

a sample marking sub-unit 4141, configured to mark a question, which has been answered by the user, in the historical exposure records as a positive sample, and mark a question, which has not been answered by the user, in the historical exposure records as a negative sample;

a feature vector extraction sub-unit 4142, configured to extract feature vectors of all positive samples and negative samples; and a model training sub-unit 4143, configured to perform CTR model training by using the feature vectors of the positive samples and the negative samples, to establish the CTR model.

The feature vector includes: a user feature vector, a question feature vector, and a scene feature vector.

The foregoing modules may be implemented by software code, and in this case, the foregoing modules may be stored in a memory. The foregoing modules may also be implemented by hardware, such as an integrated circuit chip.

It should be noted that, functions of the functional modules in this embodiment of the present invention may be specifically implemented according to the method in the foregoing method embodiment; for a specific implementation process, reference may be made to the related description of the foregoing method embodiment, and details are not described herein again.

In this embodiment of the present invention, a short-term interest, a long-term interest, and a group interest of a user are combined to construct an interest vector of the user; a candidate-for-recommendation question is acquired from a set of to-be-resolved questions according to interest items in the interest vector of the user; then a probability of answering the candidate-for-recommendation question by the user is estimated according to a CTR model; a to-be-recommended question is selected according to the estimated probability, and the to-be-recommended question is recommended to a client, so that the recommended question is a question that meets interests of the user and that the user is willing to answer. Further, the recommendation result can further improve a question answering rate of an interactive question-and-answer platform.

Fifth Embodiment

Figure 18:
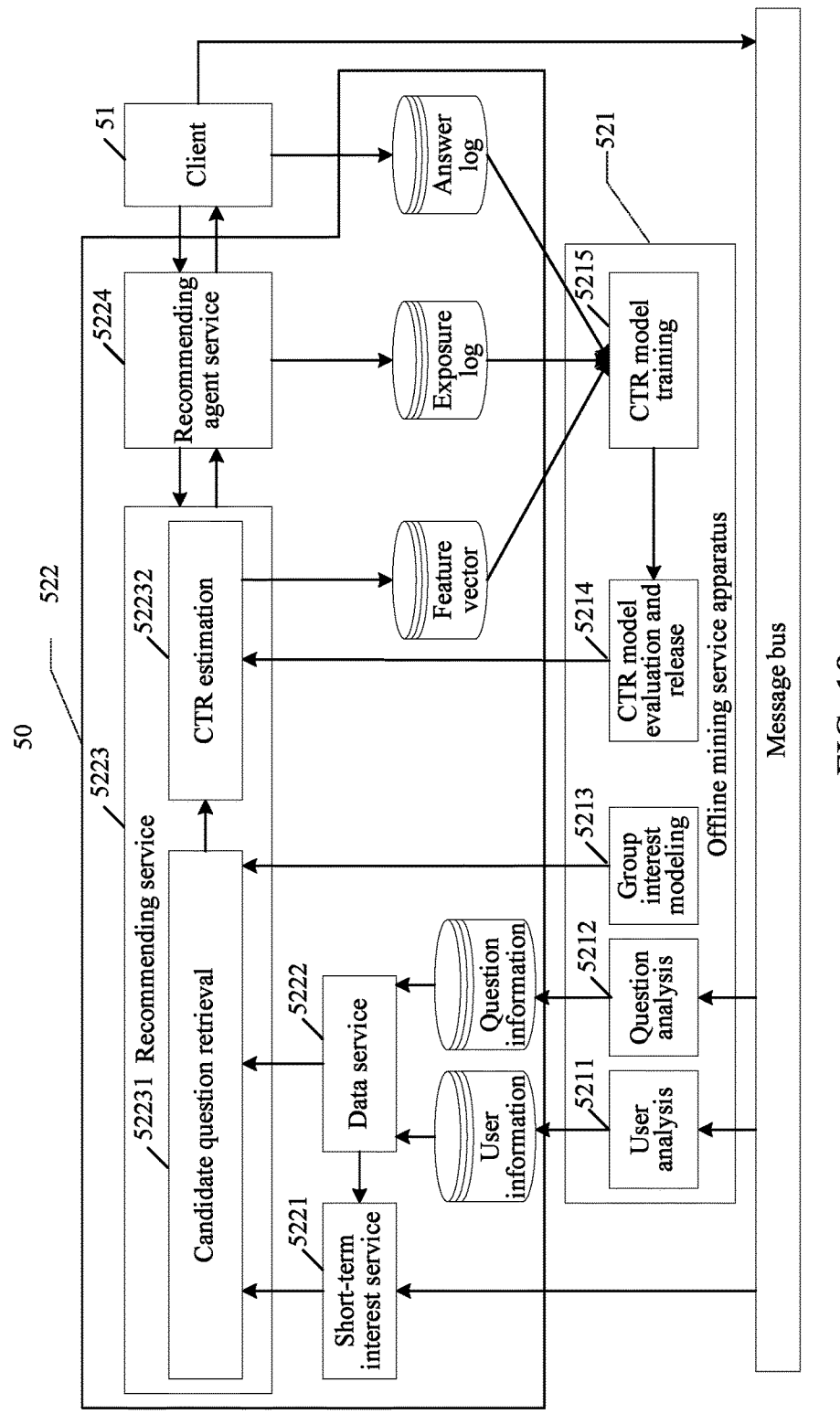
FIG. 18 is a block diagram of a principle of a question recommending system in a fifth embodiment of the present invention.

Refer to FIG. 18, which is a schematic structural diagram of a question recommending system according to a fifth embodiment of the present invention. The system 50 includes: a client 51 and a server side. The client 51 feeds back an answering behavior of a user to the server side, and sends a question recommending request to the server side.

The server side includes an offline mining service apparatus 521 and an online recommending service apparatus 522.

The offline mining service apparatus 521 is configured to acquire a long-term interest of the user according to attributes and question answering records of the user, establish a model for a group interest, and establish a CTR model.

Specifically, the offline mining service apparatus 521 may analyze the user by using a user analysis module 5211, including integrating the attributes of the user and digging out the long-term interest of the user. The offline mining service apparatus 521 may further perform question analysis by using a question analysis module 5212, including performing text analysis on questions, extract keywords of the questions, classifying the questions, and the like. The offline mining service apparatus 521 may further establish the model for the group interest by using a group interest modeling module 5213, including training a group interest model based on historical answer records. The offline mining service apparatus 521 may further perform CTR model training by using a CTR modeling estimation and release module 5214, including training the CTR model based on feature vectors and historical exposure records that are buffered online and question answering records provided by the client. The offline mining service apparatus 521 may further train and release the CTR model by using a CTR model training module 5212, automatically evaluate a CTR model currently used online and a model newly generated by means of training, to determine whether the new model is better than the model online and choose an optimal model to release.

The online recommending service apparatus 522 is configured to calculate a short-term interest of the user according to real-time answer records of the user within predetermined duration prior to a current time; acquire the group interest of the user according to the group interest model, and construct an interest vector of the user according to the long-term interest, the short-term interest, and the group interest of the user; acquire at least one candidate-for-recommendation question from a set of to-be-resolved questions according to multiple interest items in the interest vector; estimate, according to the CTR model, a probability of answering the candidate-for-recommendation question by the user; and select a to-be-recommended question from the at least one candidate-for-recommendation question according to the estimated probability, and recommend the to-be-recommended question to the client.

Specifically, the online recommending service apparatus 522 may further provide a short-term interest service by using a short-term interest service module 5221, including being responsible for maintaining recent answering behaviors of the user, calculating the short-term interest of the user, and providing a consultation service. The online recommending service apparatus 522 may further provide a data service by using a data service module 5222, including being responsible for providing user information (including the attributes and long-term interest of the user) and question information (including attributes of questions, classification of the questions, keywords of the questions, and the like) for a recommending service. The online recommending service apparatus 522 may further provide a recommending service, namely, the major service of the system, by using a recommending service module 5223. Specifically, for a recommending request from the client, a candidate question retrieving sub-module 52231 retrieves user information and the short-term interest of the user, calculates the group interest of the user, and retrieves the candidate-for-recommendation question. A CTR estimation module 52232 performs CTR estimation, sorting, and the like for candidate-for-recommendation questions, and further records feature vectors. The online recommending service apparatus 522 may further perform a recommending agent service by using a recommending agent service 5224, including being responsible for processing a request from the client, submitting a recommending request to the recommending service, buffering a recommendation result, and recording an exposure log.

In the foregoing system, there are two self-feedback mechanisms: one is a self-feedback mechanism of the short-term interest, in which a question answering behavior performed by the user on the client is fed back to the short-term interest service by means of a message bus, and the short-term interest service is responsible for maintaining a behavior list and updating the short-term interest; the other is a self-feedback mechanism of the CTR model, in which the feature vectors, exposed question records, and historical answer records recorded by the recommending service, the recommending agent service, and the client are automatically pushed to an offline CTR training module, where 90% of samples may be used as training samples for CTR model training, 10% of the samples may be used as test samples for model evaluation, and after estimated effects of a new model and an online model are compared, a model is released automatically.

It should be noted that the embodiments in this specification are all described in a progressive manner, each embodiment focuses on a difference from other embodiments, and for same or similar parts in the embodiments, refer to these embodiments. An apparatus embodiment is basically similar to a method embodiment, and therefore is described briefly; for related parts, refer to partial descriptions in the method embodiment.

It should be noted that, the terms "include", "comprise", or any other variant thereof herein are intended to cover a non-exclusive inclusion, so that a process, a method, an article, or an apparatus that includes a list of elements not only includes those elements but also includes other elements that are not expressly listed, or further includes elements inherent to such a process, method, article, or apparatus. An element preceded by "includes a . . . " does not, without more constraints, preclude the presence of additional identical elements in the process, method, article, or apparatus that includes the element.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The above descriptions are merely preferred embodiments of the present invention, but do not constitute any limitation on the form of the present disclosure. Although the present disclosure has been disclosed above by using preferred embodiments, the preferred embodiments are not intended to limit the present disclosure. Any person skilled in the art can make some changes or modifies the preferred embodiments to be equivalent embodiments by using the technical content disclosed above without departing from the scope of the technical solutions of the present disclosure. Any simple alteration or equivalent change and modification made to the foregoing embodiments according to the substance of the technology of the present disclosure without departing from the content of the technical solutions of the present disclosure still fall in the scope of the technical solutions of the present disclosure.

What is claimed is:

1. A question recommending method, comprising:
constructing, by a server, an interest vector of a user according to a short-term interest, a long-term interest, and a group interest of the user, the interest vector of the user comprising multiple interest items, further comprising combining the short-term interest, the long-term interest, and the group interest of the user according to a vector weighting coefficient of the short-term interest of the user, a vector weighting coefficient of the long-term interest of the user, and a vector weighting coefficient of the group interest of the user and by means of linear weighting of vectors, to obtain the interest vector of the user;
acquiring, by the server, at least one candidate-for-recommendation question from a set of to-be-resolved questions according to the multiple interest items;
separately estimating, by the server according to a click-through rate (CTR) model, a probability of answering the at least one candidate-for-recommendation question by the user;
selecting, by the server, a to-be-recommended question from the at least one candidate-for-recommendation question according to the estimated probability; and
recommending the to-be-recommended question to a client of the user.

2. The method according to claim 1, before the constructing an interest vector of a user according to a short-term interest, a long-term interest, and a group interest of the user, further comprising:
calculating the short-term interest of the user according to real-time answer records of the user within predetermined duration prior to a current time.

3. The method according to claim 2, wherein the calculating the short-term interest of the user according to real-time answer records of the user within predetermined duration prior to a current time comprises:
acquiring the real-time answer records of the user within the predetermined duration prior to the current time;
extracting, according to the real-time answer records, an interest item corresponding to each question and a time at which each question is answered, and constructing a circular queue by using the time at which each question is answered as a timestamp of the interest item corresponding to the question, by using the interest item as an element, and according to the timestamp corresponding to the interest item;
calculating a weight corresponding to each interest item according to the circular queue; and
calculating the short-term interest of the user according to the weight corresponding to each interest item.

4. The method according to claim 1, before the constructing an interest vector of a user according to a short-term interest, a long-term interest, and a group interest of the user, further comprising:
calculating the group interest of the user according to historical answer records, attributes of the user, and an occurrence probability of an interest item corresponding to each attribute of the user.

5. The method according to claim 4, wherein the calculating the group interest of the user according to historical answer records, attributes of the user, and an occurrence probability of an interest item corresponding to each attribute of the user comprises:
classifying all users into groups of different types according to the attribute combination of the user;
calculating an occurrence probability of each interest item corresponding to the attribute combination of the user;
calculating weights of interest items corresponding to the group of each type according to the probability;
searching for a group corresponding to the user according to the attributes of the user; and
calculating the group interest of the user according to weights of interest items corresponding to the group.

6. The method according to claim 1, before the constructing an interest vector of a user according to a short-term interest, a long-term interest, and a group interest of the user, further comprising:
establishing the CTR model according to historical answer records and historical exposure records.

7. The method according to claim 6, wherein the step of establishing a CTR model according to historical answer records and historical exposure records comprises:
marking a question, which has been answered by the user, in the historical exposure records as a positive sample, and marking a question, which has not been answered by the user, in the historical exposure records as a negative sample;
extracting feature vectors of all positive samples and negative samples; and
performing CTR model training by using the feature vectors of the positive samples and the negative samples, to establish the CTR model.

8. The method according to claim 1, wherein the vector weighting coefficient of the short-term interest of the user is greater than the vector weighting coefficient of the long-term interest of the user, and the vector weighting coefficient of the long-term interest of the user is greater than the vector weighting coefficient of the group interest of the user, wherein the vector weighting coefficient of the short-term interest of the user is greater than or equal to 0.5 and less than or equal to 0.8, the vector weighting coefficient of the long-term interest of the user is greater than or equal to 0.1 and less than or equal to 0.5, and the vector weighting coefficient of the group interest of the user is greater than or equal to 0.1 and less than or equal to 0.5.

9. The method according to claim 1, wherein the acquiring at least one candidate-for-recommendation question from a set of to-be-resolved questions according to the multiple interest items comprises:
calculating correlation between questions in the set of to-be-resolved questions and the interest vector of the user according to the multiple interest items;
sorting the questions according to the correlation; and
extracting a question whose correlation is in a predetermined range as the candidate-for-recommendation question.

10. The method according to claim 1, wherein the estimating, according to a CTR model, a probability of answering the candidate-for-recommendation question by the user comprises:
extracting a feature vector of the user, a feature vector of the candidate-for-recommendation question, and a feature vector of a current scene; and
estimating, by using the feature vectors and the CTR model, the probability of answering the candidate-for-recommendation question by the user.

11. A server, comprising:
one or more processors;
memory; and
one or more programs stored in the memory that, when executed by the one or more processors, cause the server to perform a plurality of operations including:
constructing, by the server, an interest vector of a user according to a short-term interest, a long-term interest, and a group interest of the user, the interest vector of the user comprising multiple interest items, further comprising combining the short-term interest, the long-term interest, and the group interest of the user according to a vector weighting coefficient of the short-term interest of the user, a vector weighting coefficient of the long-term interest of the user, and a vector weighting coefficient of the group interest of the user and by means of linear weighting of vectors, to obtain the interest vector of the user;
acquiring, by the server, at least one candidate-for-recommendation question from a set of to-be-resolved questions according to the multiple interest items;
separately estimating, by the server according to a click-through rate (CTR) model, a probability of answering the at least one candidate-for-recommendation question by the user;
selecting, by the server, a to-be-recommended question from the at least one candidate-for-recommendation question according to the estimated probability; and
recommending the to-be-recommended question to a client of the user.

12. The server according to claim 11, wherein the plurality of operations further include:
before the constructing an interest vector of a user according to a short-term interest, a long-term interest, and a group interest of the user, calculating the short-term interest of the user according to real-time answer records of the user within predetermined duration prior to a current time.

13. The server according to claim 12, wherein the operation of calculating the short-term interest of the user according to real-time answer records of the user within predetermined duration prior to a current time comprises:
- acquiring the real-time answer records of the user within the predetermined duration prior to the current time;
- extracting, according to the real-time answer records, an interest item corresponding to each question and a time at which each question is answered, and constructing a circular queue by using the time at which each question is answered as a timestamp of the interest item corresponding to the question, by using the interest item as an element, and according to the timestamp corresponding to the interest item;
- calculating a weight corresponding to each interest item according to the circular queue; and
- calculating the short-term interest of the user according to the weight corresponding to each interest item.

14. The server according to claim 11, wherein the plurality of operations further include:
- before the constructing an interest vector of a user according to a short-term interest, a long-term interest, and a group interest of the user, calculating the group interest of the user according to historical answer records, attributes of the user, and an occurrence probability of an interest item corresponding to each attribute of the user.

15. The server according to claim 14, wherein the operation of calculating the group interest of the user according to historical answer records, attributes of the user, and an occurrence probability of an interest item corresponding to each attribute of the user comprises:
- classifying all users into groups of different types according to the attribute combination of the user;
- calculating an occurrence probability of each interest item corresponding to the attribute combination of the user;
- calculating weights of interest items corresponding to the group of each type according to the probability;
- searching for a group corresponding to the user according to the attributes of the user; and
- calculating the group interest of the user according to weights of interest items corresponding to the group.

16. The server according to claim 11, wherein the plurality of operations further include:
- before the constructing an interest vector of a user according to a short-term interest, a long-term interest, and a group interest of the user, establishing the CTR model according to historical answer records and historical exposure records.

17. The server according to claim 16, wherein the operation of establishing a CTR model according to historical answer records and historical exposure records comprises:
- marking a question, which has been answered by the user, in the historical exposure records as a positive sample, and marking a question, which has not been answered by the user, in the historical exposure records as a negative sample;
- extracting feature vectors of all positive samples and negative samples; and
- performing CTR model training by using the feature vectors of the positive samples and the negative samples, to establish the CTR model.

18. The server according to claim 11, wherein the vector weighting coefficient of the short-term interest of the user is greater than the vector weighting coefficient of the long-term interest of the user, and the vector weighting coefficient of the long-term interest of the user is greater than the vector weighting coefficient of the group interest of the user, wherein the vector weighting coefficient of the short-term interest of the user is greater than or equal to 0.5 and less than or equal to 0.8, the vector weighting coefficient of the long-term interest of the user is greater than or equal to 0.1 and less than or equal to 0.5, and the vector weighting coefficient of the group interest of the user is greater than or equal to 0.1 and less than or equal to 0.5.

19. The server according to claim 11, wherein the acquiring at least one candidate-for-recommendation question from a set of to-be-resolved questions according to the multiple interest items comprises:
- calculating correlation between questions in the set of to-be-resolved questions and the interest vector of the user according to the multiple interest items;
- sorting the questions according to the correlation; and
- extracting a question whose correlation is in a predetermined range as the candidate-for-recommendation question.

20. The server according to claim 11, wherein the operation of estimating, according to a CTR model, a probability of answering the candidate-for-recommendation question by the user comprises:
- extracting a feature vector of the user, a feature vector of the candidate-for-recommendation question, and a feature vector of a current scene; and
- estimating, by using the feature vectors and the CTR model, the probability of answering the candidate-for-recommendation question by the user.

* * * * *